United States Patent [19]

Siegenthaler et al.

[11] Patent Number: 4,942,842
[45] Date of Patent: Jul. 24, 1990

[54] APPARATUS FOR COATING SHEETS OF DOUGH WITH FAT

[75] Inventors: Peter Siegenthaler, Toffen; Andreas Zwahlen, Burgdorf, both of Switzerland

[73] Assignee: Seewer AG, Burgdorf, Switzerland

[21] Appl. No.: 295,200

[22] Filed: Jan. 9, 1989

[30] Foreign Application Priority Data

Jan. 11, 1988 [DE] Fed. Rep. of Germany ....... 3800516

[51] Int. Cl.$^5$ .............................................. B05C 5/02
[52] U.S. Cl. .................................... 118/24; 99/450.1; 425/104; 425/202; 425/206; 425/209; 425/297; 425/305.1; 425/311
[58] Field of Search ............... 425/113, 202, 206, 209, 425/380, 381, 382.3, 382.4, 297, 305.1, 309, 311, 90, 104; 118/13, 24, 25, 300, 323, 324; 99/450.1; 426/516, 517, 530; 366/77

[56] References Cited

U.S. PATENT DOCUMENTS

| | | | |
|---|---|---|---|
| 3,262,470 | 7/1966 | Alcaro | 425/309 X |
| 3,280,764 | 10/1966 | Potter et al. | 425/202 |
| 3,415,206 | 12/1968 | Reisman | 425/311 |
| 3,778,036 | 12/1973 | Collin | 425/209 X |
| 4,137,023 | 1/1979 | Moked et al. | 425/382.3 X |
| 4,296,135 | 10/1981 | Rutten | 426/517 X |
| 4,461,779 | 7/1984 | Peters | 426/516 |
| 4,676,727 | 6/1987 | Atwood | 425/311 X |
| 4,770,619 | 9/1988 | Rijkaart | 426/517 X |
| 4,800,094 | 1/1989 | Freda et al. | 426/516 X |

FOREIGN PATENT DOCUMENTS

| | | | |
|---|---|---|---|
| 83955 | 7/1983 | European Pat. Off. | |
| 895688 | 1/1982 | U.S.S.R. | 425/382.3 |

Primary Examiner—Richard L. Chiesa
Attorney, Agent, or Firm—Salter & Michaelson

[57] ABSTRACT

A conveyor roller (8) has circular-saw-shaped teeth (28) on its circumference. By means of the conveyor roller set in rotation, shavings are pared off cubes of fat (9) and uniformly fill up the tooth gaps (27). The fat is conveyed along a cylindrical housing part (29) to a nozzle space (36). The nozzle space is bounded by an adjustable end portion (30) of the housing part and an adjustable stripper (32). At the end of the nozzle space, a homogeneous strip of fat is discharged through a nozzle orifice (40). The stripper has a control portion which is actuated by the teeth on the circumference of the conveyor roller. Another stripper portion (37) continually removes the fat in each tooth gap. Fats of very different consistencies can be processed. Optimum plasticization takes place during transformation of the cubes of fat into a strip of fat. The fat is warmed only a very little during the transformation operation. Thin strips of fat having great homogeneity can be produced.

14 Claims, 3 Drawing Sheets

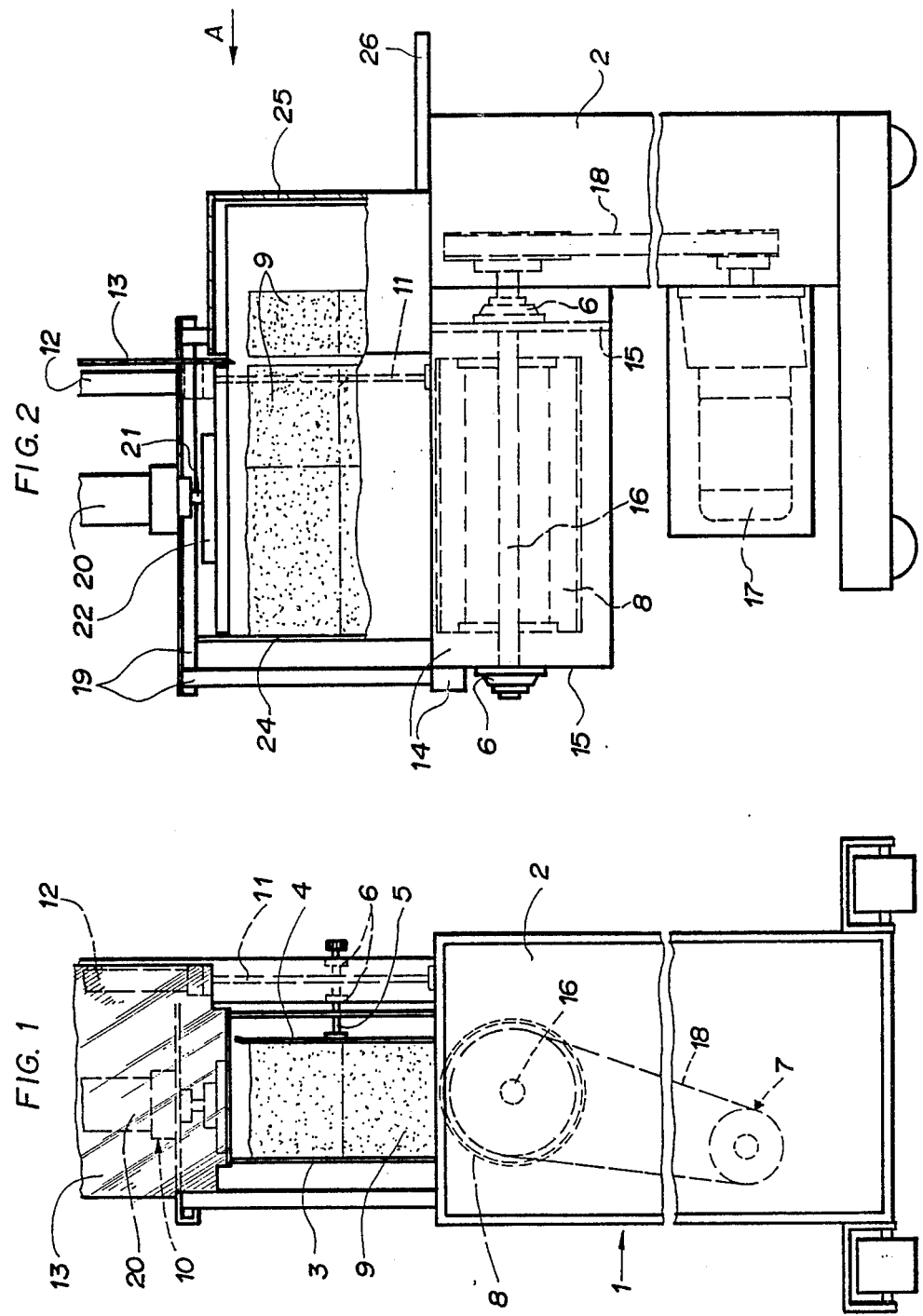

APPARATUS FOR COATING SHEETS OF DOUGH WITH FAT

BACKGROUND AND SUMMARY OF THE INVENTION

This invention relates to baking equipment, and more particularly to apparatus for coating sheets of dough with fat, of the type having a container for receiving at least one block of fat, a nozzle space, and conveyor means for conveying the fat from the container to the nozzle space.

European Pat. No. 0 083 955 describes a pump system which is basically suitable for producing strips of fat. This pump system works on the principle of a rotary pump with two rotors.

However, apparatus for coating dough with butter and the like for use in the baking industry must meet very particular requirements. It must be capable of processing fats of very different consistencies. While the blocks of fat are being shaped into strips, optimum plasticization must take place. The fat should be warmed only a very little during the shaping operation, this being of great importance especially when butter is used. The amount of throughput must be very constant in order to obtain a strip of fat having only slight differences in weight per unit of length. It should be possible to obtain thin, homogeneous strips of fat having a homogeneous thickness down to about 2 mm.

It is therefore an object of this invention to provide improved apparatus for coating sheets of dough with fat which meets the foregoing requirements.

To this end, in the apparatus according to the present invention, of the type initially mentioned, the conveyor means are provided with parts for removing fat from the block of fat, and a stripper for at least partially taking away the fat in the removal parts and for supplying the same to the nozzle space, a nozzle orifice for discharging a strip of fat being provided at one end of the nozzle space.

One advantage of the inventive apparatus is that cubes of fat of commercial size can be loaded without being cut down, even when they are not uniform. Spaces are kept from forming between the individual cubes along the length of the conveyor roller. The tooth gaps of the conveyor roller are always completely filled even with fats of differing consistencies. In order to be able to press out thin strips of fat as well, considerable pressures can be produced in the nozzle portion, the fat being prevented thereby from flowing back. Otherwise, there would be no constant output. Both vegetable and animal fats may be used. By means of the 100% filling of the tooth gaps, even application of the fat, i.e., a homogeneous strip of fat, is produced. This is achieved inter alia by means of adjustable pressure on the blocks of fat. The adjustable pressure is necessary in order to achieve adaptation to the type of fat. The teeth along the circumference of the conveyor roller are undercut in order to be able to keep the pressure on the blocks of fat, and thus the increase in temperature of the fat, as low as possible. The fat still remaining in the tooth gaps after stripping is exchanged when a further layer is shaved off the block of fat, so that the undercut of the teeth is fully effective. The fat is removed in layers, which has the advantage of obtaining optimum plasticization.

BRIEF DESCRIPTION OF THE DRAWINGS

Preferred embodiments of the invention and its use will now be described in detail with reference to the accompanying drawings, in which:

FIG. 1 is an elevation of the apparatus for coating sheets of dough with fat,

FIG. 2 is a side elevation of the apparatus of FIG. 1,

DESCRIPTION OF THE INVENTION

Figure 3:
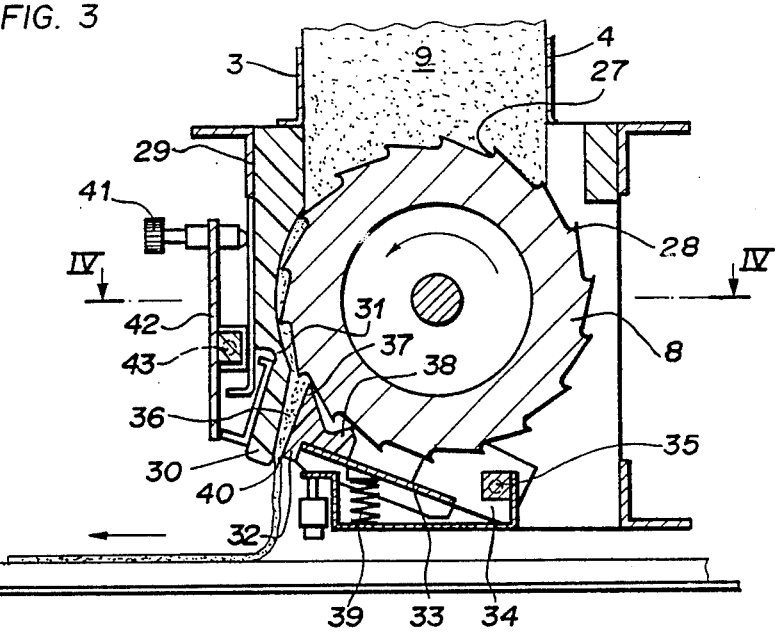
FIG. 3 is a side elevation, partially in section, of the conveyor roller with stripper and nozzle portion.

FIG. 1 shows the fat-coating apparatus 1 from the operating side. Mounted on a column 2 are a fixed bin wall 3 and a displaceable bin wall 4. Affixed to wall 4 are guide rods 5 slidingly mounted in bearings 6. A drive unit 7 shown diagrammatically in this drawing figure drives a conveyor roller 8, likewise indicated diagrammatically. Between bin walls 3 and 4 are one or more cubes of fat 9 which are pressed against conveyor roller 8 by means of a pressing device 10. Provided on column 2 is a fixed piston rod 11 on which a pneumatic cylinder 12 is vertically slidable. Cylinder 12 is connected to a knife plate 13 for trimming the cubes of fat.

In FIG. 2, apparatus 1 is illustrated in the production direction. Affixed to column 2 are projecting supporting elements 14 which bear attachment plates 15 to which the bearings 6 holding an axle 16 of conveyor roller 8 are secured. Conveyor roller 8 is driven by a geared engine 17 via a chain drive 18. Erected on supporting elements 14 is a yoke 19 bearing a press cylinder 20. Fastened to a piston rod 21 of cylinder 20 is a pressure plate 22 which presses cubes of fat 9 against conveyor roller 8. Also mounted on yoke 19 are piston rod 11 and pneumatic cylinder 12 bearing knife plate 13. Cubes of fat 9, thrust in the direction indicated by arrow A into the fat bin consisting of sidewalls 3 and 4 and rear wall 24, are trimmed to the desired length by knife plate 13. Pressure is exerted manually or mechanically upon the cubes of fat in direction A so that no space occurs between them which would impair the continuity of the strip of fat to be formed. After the trimming operation, knife plate 13 remains in lowered position and thus forms the front wall of the fat bin. While cubes of fat 9 are being loaded, a protective device 25 is slid upward. A platform 26 is used for loading the cubes of fat.

FIG. 3 is a side elevation of conveyor roller 8 with a stripper 32 and a nozzle portion 30. Conveyor roller 8 removes fat from 9 so that the tooth gaps 27 of circular-saw-shaped teeth 28 on the circumference of conveyor roller 8 are completely filled up with fat. A cylindrical housing part 29 enclosing conveyor roller 8 is so designed that teeth 28 of conveyor roller 8 glide along it and the volume of fat conveyed per tooth gap 27 is thus clearly determined. Housing part 29 is also capable of preventing any return flow from a nozzle space 36. At a transition point 31, housing part 29 changes into nozzle portion 30, the transition being made flexible for adjusting the nozzle. A stripper 32, connected by a plate-shaped connection 33 to bearing holders 34 which are pivoted on a spindle 35, slides over conveyor roller 8 and thus withdraws the fat from tooth gaps 27. Stripper 32 also forms the counterpart of nozzle portion 30, i.e., nozzle portion 30 and stripper 32, together with conveyor roller 8, bound nozzle space 36, which should be as small as possible. Stripper 32 has a stripping portion 37 and a control portion 38 for lowering stripper 32 at the proper moment out of tooth gap 27 against the bias of compression springs 39. A nozzle orifice 40 formed at the front ends of nozzle portion 30 and stripper 32 can be adjusted by means of a spindle 41 and a lever 42 which is rotatingly mounted on an axis 43 and acts upon nozzle portion 30.

The design of nozzle space 36 between the bottom 30 of housing part 29 and stripper 32 has the advantage that the gate for ejecting the strip of fat does not become too large. If the gate is made too large, the fat does not flow along the walls and is not homogeneously conveyed. Turbulence may be produced. The fat might also remain stationary at certain points and become rancid. With the inventive apparatus described above, the fat is only negligibly warmed and is conveyed optimally plasticized through nozzle orifice 40.

Figure 4:
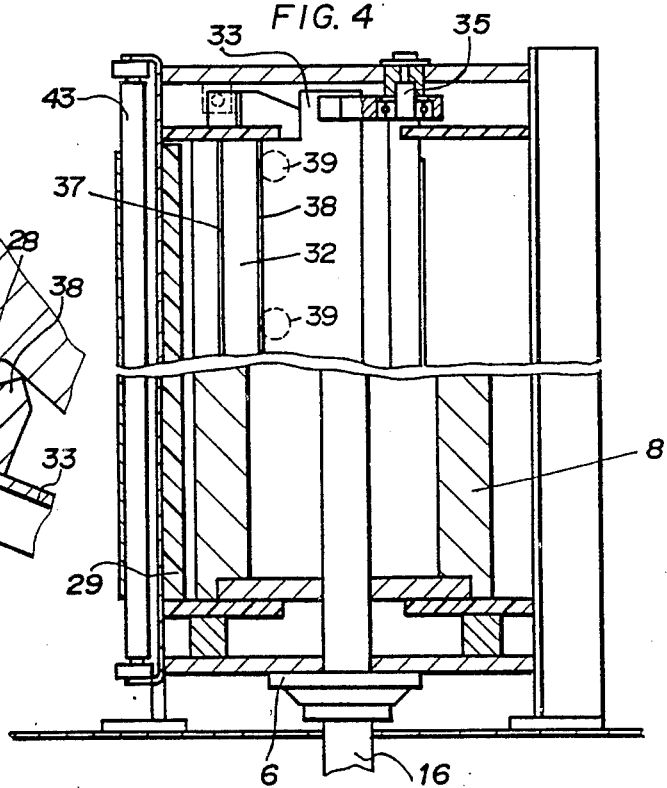
FIG. 4 is a section taken on the line IV—IV of FIG. 3, the conveyor roller being omitted from the upper part of FIG. 4.

FIG. 4 is a section taken on the line IV—IV of FIG. 3, conveyor roller 8 not being shown in the upper part of FIG. 4.

Figure 5:
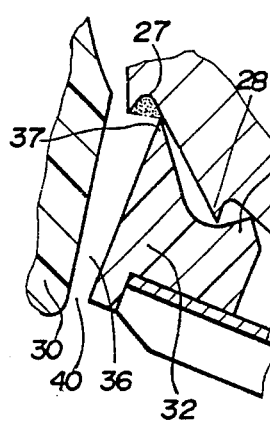
FIG. 5 is a section through the stripper and the lower housing part of the front wall, which together form the nozzle portion.

In FIG. 5, the bottom nozzle portion 30 of housing part 29 and stripper 32, which together form nozzle space 36 and nozzle orifice 40, are illustrated in detail. By means of the circular-saw like shape of teeth 28 on roller 8, an optimum pick-up effect is achieved, the purpose of which is to fill the individual tooth gaps 27 totally with fat. The aim is uniform distribution of the fat over the entire nozzle width so that the strip of fat deposited on the sheet of dough is homogeneous, of consistent thickness, and free of air bubbles. Any fat remaining in a tooth gap 27 is pushed forward during the next revolution. Control portion 38 of stripper 32 is so designed that the stripper tip 37 is lifted over teeth 28.

Figure 6:
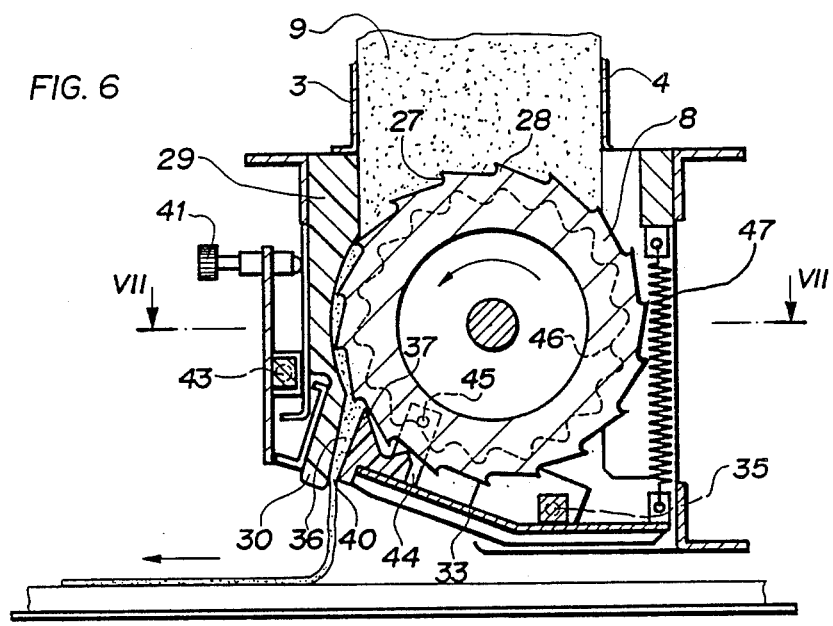
FIG. 6 is a side elevation, partially in section, of the conveyor roller with stripper and nozzle portion in a second embodiment of the invention.

FIG. 6 illustrates the conveyor roller, stripper, and nozzle portion in a second embodiment of the invention. Those parts which are the same as in the first embodiment are designated by the same reference numerals. Compared with the embodiment of FIGS. 1-5, only the control the stripper movement is differently designed. Attached to plate-shaped connection 33 are holders 44 bearing rollers 45 which run in cam grooves 46 and thus guide stripper part 37 along the tooth gap shape without part 37 being pressed against conveyor roller 8. A tension spring 47 is provided so that rollers 45 follow the curves of cam grooves 46. Rollers 45 are pulled against curve 46 by spring 47.

Figure 7:
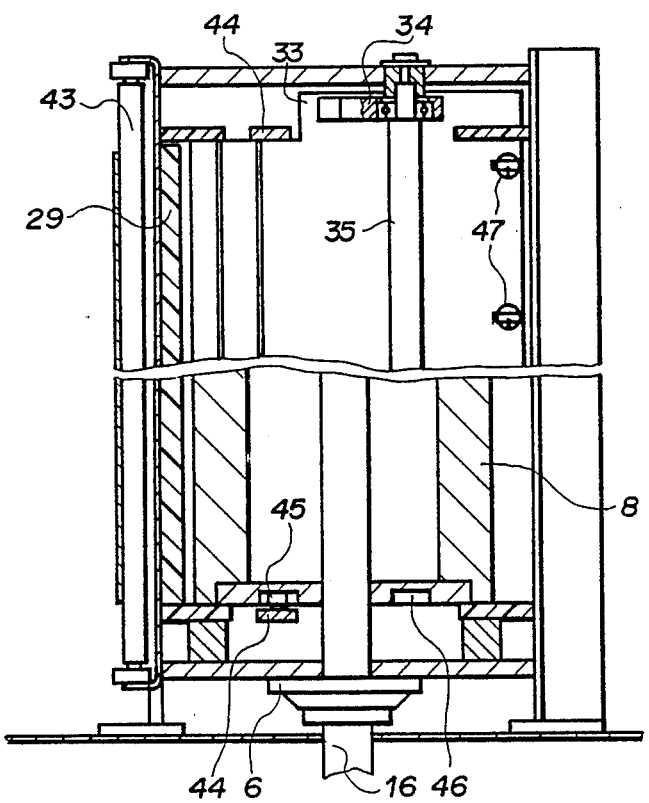
FIG. 7 is a section taken on the line VII—VII of FIG. 6, the conveyor roller being omitted from the upper part of FIG. 7.

In the upper part of FIG. 7, a section taken on the line VII—VII of FIG. 6, conveyor roller 8 is not shown.

In another embodiment not illustrated in the drawings, the conveyor means might take the form of a caterpillar track.

What is claimed is:

1. In an apparatus for coating sheets of dough with fat having a container for receiving at least one block of fat, a nozzle space, and conveyor means for conveying the fat from the container to the nozzle space, wherein the improvement comprises:

fat-grasping means forming part of said conveyor means, a stripper component forming part of said conveyor means for at least partially removing fat from said fat-grasping means and conveying it to said nozzle space, and a nozzle orifice disposed at one end of said nozzle space, wherein said conveyor means comprise at least one conveyor roller, said fat-grasping means being disposed on the circumference of said conveyor roller, and said fat-grasping means having the shape of circular-saw teeth.

2. The apparatus of claim 1, further comprising a spindle, lever means pivoted about said spindle, and at least one spring means, said stripper component being disposed on said lever means and movable against the bias of said spring means.

3. The apparatus of claim 1, wherein said conveyor roller includes cam means, further comprising means secured to said stripper component and cooperating with said cam means for controlling the movement of said stripper component.

4. The apparatus of claim 1, wherein said conveyor roller includes cam means, further comprising lever means bearing said stripper component and means secured to said lever means and cooperating with said cam means for controlling the movement of said stripper component.

5. The apparatus of claim 1, wherein said container has a plurality of walls, one of said walls taking the form of a knife plate.

6. The apparatus of claim 1, further comprising a cylinder-piston unit for vertical adjustment of said knife plate.

7. The apparatus of claim 1, further comprising press means disposed above said container for exerting adjustable pressure upon the block of fat.

8. In an apparatus for coating sheets of dough with fat having a container for receiving at least one block of fat, a nozzle space, and conveyor means for conveying the fat from the container to the nozzle space, wherein the improvement comprises:

fat-grasping means forming part of said conveyor means, a stripper component forming part of said conveyor means for at least partially removing fat from said fat-grasping means and conveying it to said nozzle space, and a nozzle orifice disposed at one end of said nozzle space, wherein said fat-grasping means comprise a plurality of teeth separated by tooth gaps, an said stripper component includes a stripping portion for removing fat from said tooth gaps.

9. In an apparatus for coating sheets of dough with fat having a container for receiving at least one block of fat, a nozzle space and conveyor means for conveying the fat from the container to the nozzle space, wherein the improvement comprises:

fat-grasping means forming part of said conveyor means, a stripper component forming part of said conveyor means for at least partially removing fat from said fat-grasping means and conveying it to said nozzle space, and a nozzle orifice disposed at one end of said nozzle space, wherein said conveyor means comprise at least one conveyor roller, said fat-grasping means being disposed on the circumference of said conveyor roller and comprising a plurality of teeth separated by tooth gaps, and said stripper component including a stripping portion for removing fat from said tooth gaps.

10. In an apparatus for coating sheets of dough with fat having a container for receiving at least one block of fat, a nozzle space, and conveyor means for conveying the fat from the container to the nozzle space, wherein the improvement comprises:

fat-grasping means forming part of said conveyor means, a stripper component forming part of said conveyor means for at least partially removing fat from said fat-grasping means and conveying it to said nozzle space, and a nozzle orifice disposed at one end of said nozzle space, wherein said conveyor means comprises at least one conveyor roller, said fat-grasping means being disposed on the circumference of said conveyor roller and having the shape of circular-saw teeth, said apparats further comprising a housing including a housing part disposed adjacent to part of the circumference of said conveyor roller, the end of said housing part nearest said nozzle orifice including a terminal portion partially bounding said nozzle space, the side of said housing part facing said conveyor roller being cylindrical and touching the points of the saw teeth or being situated very close thereto.

11. In an apparatus for coating sheets of dough with fat having a container for receiving at least one block of fat, a nozzle space, and conveyor means for conveying the fat from the container to the nozzle space, wherein the improvement comprises:

fat-grasping means forming part of said conveyor means, a stripper component forming part of said conveyor means for at least partially removing fat from said fat-grasping means and conveying it to said nozzle space, and a nozzle orifice disposed at one end of said nozzle space, wherein said conveyor means comprise at least one conveyor roller, said fat-grasping means being disposed on the circumference of said conveyor roller and comprising a plurality of teeth separated by tooth gaps, said stripper component including a stripping portion for removing fat from said tooth gaps, and said nozzle space being partially bounded by said stripper component.

12. In an apparatus for coating sheets of dough with fat having a container for receiving at least one block of fat, a nozzle space having an end, and conveyor means for conveying the fat from the container to the nozzle space, wherein the improvement comprises:

fat-grasping means forming part of said conveyor means, a stripper component forming part of said conveyor means for at least partially removing fat from said fat-grasping means and conveying it to said nozzle space, a nozzle orifice disposed at one end of said nozzle space, said conveyor means further comprising at least one conveyor roller, said apparatus further comprising a housing including a housing part disposed adjacent to part of the circumference of said conveyor roller, said housing part including a terminal nozzle portion partially bounding said nozzle space, said housing part merging into said nozzle portion at a flexible transition point for adjusting the nozzle orifice.

13. In an apparatus for coating sheets of dough with fat having a container for receiving at least one block of fat, a nozzle space, and conveyor means for conveying the fat from the container to the nozzle space, wherein the improvement comprises:

fat-grasping means forming part of said conveyor means, said fat-grasping means comprising a plurality of teeth separated by tooth gaps, a stripper component forming part of said conveyor means, said stripper component including a stripping portion and a control portion, said stripping portion being operative for at least partially removing fat from said tooth gaps and conveying it to said nozzle space, and a nozzle orifice disposed at one end of said nozzle space.

14. In an apparatus for coating sheets of dough with fat having a container for receiving at least one block of fat, a nozzle space, and conveyor means for conveying the fat from the container to the nozzle space, wherein the improvement comprises:

fat-grasping means forming part of said conveyor means, said fat-grasping means having the shape of circular-saw teeth, a stripper component forming part of said conveyor means for at least partially removing fat from said fat-grasping means and conveying it to said nozzle space, and a nozzle orifice disposed at one end of said nozzle space.

* * * * *